United States Patent
Cheng

(10) Patent No.: US 10,417,080 B2
(45) Date of Patent: Sep. 17, 2019

(54) REMOTE CLIENT SCREEN SHOTS MONITORING SYSTEM AND METHOD

(71) Applicant: HONGFUJIN PRECISION ELECTRONICS (TIANJIN) CO.,LTD., Tianjin (CN)

(72) Inventor: Yu-Chieh Cheng, New Taipei (TW)

(73) Assignee: HONGFUJIN PRECISION ELECTRONICS(TIANJIN)CO., LTD., Tianjin (CN)

(*) Notice: Subject to any disclaimer, the term of this patent is extended or adjusted under 35 U.S.C. 154(b) by 260 days.

(21) Appl. No.: 15/598,413

(22) Filed: May 18, 2017

(65) Prior Publication Data
US 2018/0300193 A1    Oct. 18, 2018

(30) Foreign Application Priority Data
Apr. 18, 2017   (CN) .......................... 2017 1 0253245

(51) Int. Cl.
| | |
|---|---|
| G06F 11/00 | (2006.01) |
| G06F 11/07 | (2006.01) |
| G06K 9/00 | (2006.01) |
| H04L 12/26 | (2006.01) |
| G06F 3/14 | (2006.01) |

(52) U.S. Cl.
CPC ........ G06F 11/079 (2013.01); G06F 11/0733 (2013.01); G06F 11/0751 (2013.01); G06F 11/0775 (2013.01); G06K 9/00442 (2013.01); H04L 43/0817 (2013.01); G06F 3/1446 (2013.01)

(58) Field of Classification Search
CPC .. G06F 11/008; G06F 11/079; G06F 11/3409; G06F 11/3452; G06F 11/3604
USPC ........................................................... 714/37
See application file for complete search history.

(56) References Cited

U.S. PATENT DOCUMENTS

| | | | |
|---|---|---|---|
| 9,405,605 B1* | 8/2016 | Marr ...................... | G06F 11/004 |
| 2010/0191944 A1* | 7/2010 | Numata ................ | G06F 21/575 |
| | | | 713/1 |
| 2012/0131179 A1* | 5/2012 | Hu ......................... | G06F 9/4416 |
| | | | 709/224 |
| 2013/0080952 A1* | 3/2013 | Dolph ................... | G06F 17/243 |
| | | | 715/767 |
| 2016/0162303 A1* | 6/2016 | Guo ...................... | G06F 9/4416 |
| | | | 713/2 |

\* cited by examiner

Primary Examiner — Sarai E Butler
(74) Attorney, Agent, or Firm — ScienBiziP, P.C.

(57) ABSTRACT

A remote client screen shots monitoring system for monitoring at least one client includes a preboot execute environment (PXE) module, a terminal multiplexing module, and a monitoring module. The PXE module controls the client to boot up. The client executes operations after booting us and generating screen shots in the process. The monitoring module obtains the screen shots from each client, converts each obtained screen shot to one file, and analyzes each converted file against certain predetermined words which may indicate a fault. The terminal multiplexing module places each generated screen shot together with those of other monitored clients in a display. The monitoring module can accordingly determine whether a fault exists in any one client. A remote client screen shots monitoring method is also provided.

20 Claims, 6 Drawing Sheets

REMOTE CLIENT SCREEN SHOTS MONITORING SYSTEM AND METHOD

FIELD

The subject matter herein generally relates to remote monitoring systems and methods.

BACKGROUND

A remote client screen shots monitoring system can used to monitor screen shots of at least one client to determine whether a fault exists.

BRIEF DESCRIPTION OF THE DRAWINGS

Implementations of the present disclosure will now be described, by way of example only, with reference to the attached figures.

DETAILED DESCRIPTION

Figure 1:
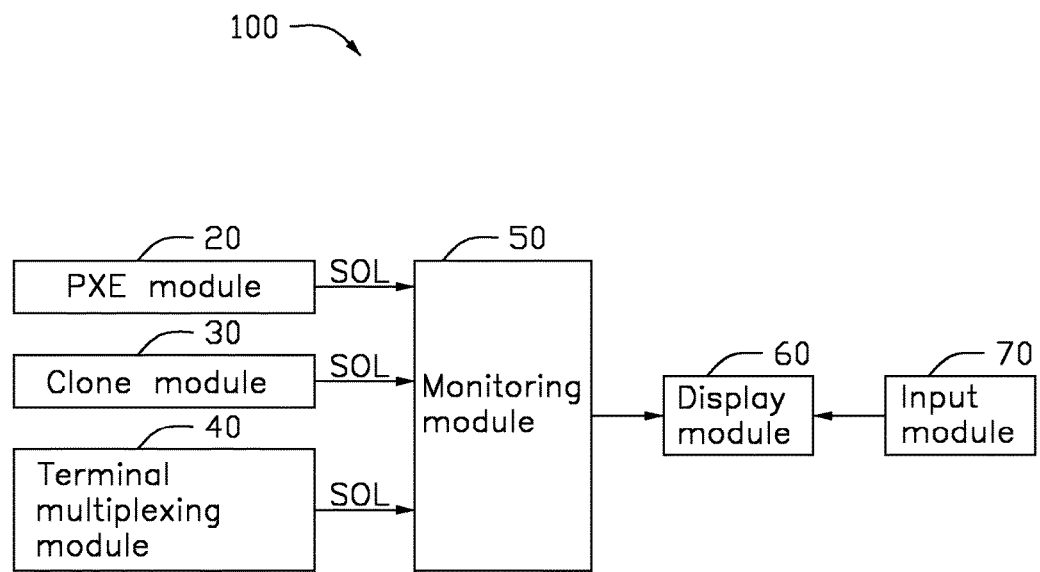
FIG. 1 is a diagram of one exemplary embodiment of a remote client screen shots monitoring system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a remote client screen shots monitoring system for monitoring screen shots of at least one client. A central user can know whether a fault exists.

Figure 2:
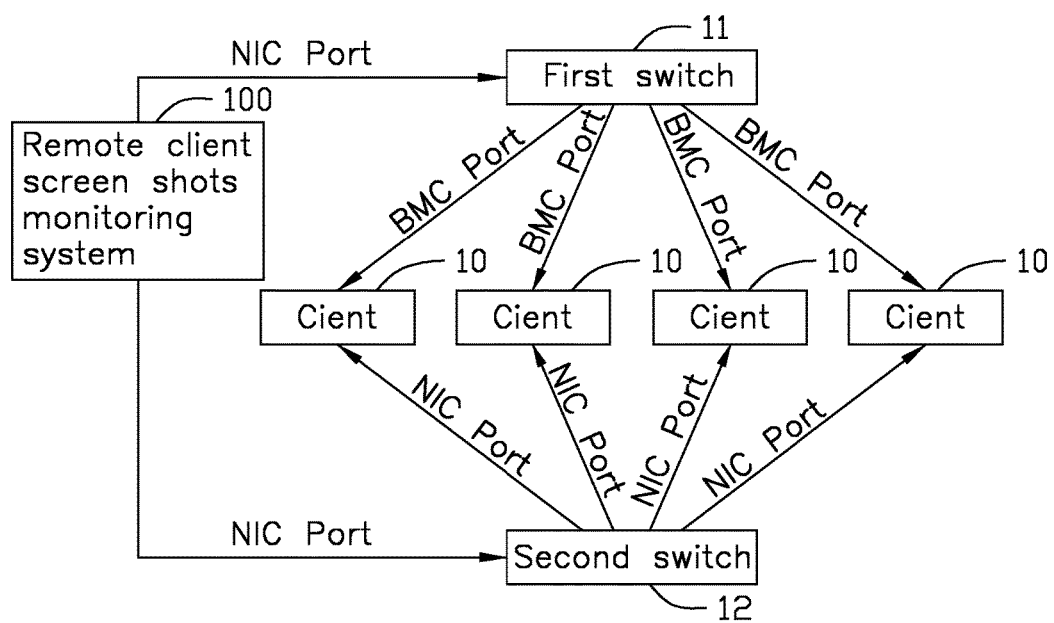
FIG. 2 is a diagram of the remote client screen shots monitoring system monitoring at least one client.

FIGS. 1-2 illustrate an exemplary embodiment of a remote client screen shots monitoring system 100. The remote client screen shots monitoring system 100 is configured to remotely monitor at least one client 10. The remote client screen shots monitoring system 100 comprises a preboot execute environment (PXE) module 20, a clone module 30, a terminal multiplexing module 40, and a monitoring module 50. In at least one exemplary embodiment, the clone module 30 can be CLONEZILLA and the terminal multiplexing module 40 can be TMUX.

Each client 10 comprises a baseboard management controller (BMC) port and a network interface controller (NIC) port. Each client 10 further comprises an internet protocol (IP) address in relation to the BMC port and NIC port. Each client 10 is connected to a first switch 11 through the BMC port. Each client 10 is connected to a second switch 12 through the NIC port. In one exemplary embodiment, a network segment of the first switch 11 is a network segment of 172.20.0.x, a network segment of the second switch 12 is a network segment of 192.8.1.x. Each client 10 further comprises its native operating system and application program. Each client 10 logs into the native operating system, executes the native application program, and generates a plurality of screen shots.

In the exemplary embodiment, the first switch 11 is a Console switch, the second switch 12 is a network switch.

The PXE module 20 is configured to start the client 10 after being executed. After the client 10 starts, the PXE module 20 and the clone module 30 are configured to control each client 10 to execute a plurality of operations. Each client 10 is configured to generate one screen shot corresponding to one operation after executing a plurality of operations. The terminal multiplexing module 40 is configured to put one generated screen shots from each client 10 to display with others after being executed. The monitoring module 50 is configured to obtain each generated screen shots from each client 10 after being executed. The monitoring module 50 is also configured to convert each generated screen shot to one file and analyze each converted file. The monitoring module 50 stores a plurality of predetermined words. The monitoring module 50 is further configured to compare each converted file with the plurality of predetermined words to determine whether a fault exists in at least one client 10. In detail, the monitoring module 50 analyzes each converted file to obtain a file attribute of each file. Each file attribute comprises a file size of each last-stored file and a time of each last-stored file. The monitoring module 50 obtains file size of each last-stored file and a timestamp of each last-stored file.

In at least one exemplary embodiment, the predetermined words stored in the monitoring module 50 are keywords relevant to the faults, such as fail, warn, and error. In another exemplary embodiment, the predetermined words stored in the monitoring module 50 can be welcomed (when the client 10 enters the native operating system to log into a login shot).

Furthermore, the PXE module 20 is configured to control the client 10 to boot up after being executed. The PXE module 20 is also configured to control each client 10 to execute the operation of installing the operating system. The clone module 30 is configured to control each client 10 to execute the operation of copying the operating system.

In the exemplary embodiment, the operations of each client 10 comprise an operation of installing the operating system, an operation of copying the operating system, and an operation of executing the native application program.

Furthermore, the remote client screen shots monitoring system 100 further comprises a serial over lan (SOL) connection.

The remote client screen shots monitoring system 100 further comprises an NIC port. The remote client screen shots monitoring system 100 communicates with the first switch 11 and the second switch 12 by network connection through the NIC port.

The PXE module 20, the clone module 30, and the terminal multiplexing module 40 communicate with the monitoring module 50 to transmit data through the SOL connection.

The remote client screen shots monitoring system 100 further comprises a display module 60. The display module 60 is configured to display the generated screen shots from each client 10. The terminal multiplexing module 40 puts the generated screen shots to display on the display module 60. Furthermore, the terminal multiplexing module 40 is configured to put generated screen shots of each client 10 to display on the display module 60 in a manner of television (TV) wall.

Furthermore, the remote client screen shots monitoring system 100 further comprises an input module 70. A user can input instructions through the input module 70. The input instructions from the input module 70 can be used to control to execute operations of each client 10 and each controlling screen shots of each client 10 being displayed on the display module 60.

The PXE module 20 is configured to control each client 10 to install the operating system through NIC port. Each client 10 is configured to generate a plurality of screen shots in the process of installing the operating system. The PXE module 20 is further configured to send one IP address in relation to the BMC port and NIC port to each client 10. Each client 10 is configured to enter a PXE boot interface after booting. Each client 10 receives the generated input instructions from the input module 70 after entering the PXE boot interface.

The clone module 30 is configured to copy the operating system to each client 10 through the NIC port. Each client 10 is configured to generate a plurality of screen shots in the process of the clone module 30 copying the operating system to each client 10.

The terminal multiplexing module 40 is configured to control each client 10 to synchronously execute one application program or one input instruction. For example, in the exemplary embodiment, the terminal multiplexing module 40 controls each client 10 to synchronously execute the operation of installing the operating system or the operation of copying the operating system, or controls each client 10 to synchronously execute the native application program. The terminal multiplexing module 40 is further configured to control each client 10 to synchronously execute the input instructions generated from input module 70.

The terminal multiplexing module 40 is further configured to export each screen shots of each client 10. The terminal multiplexing module 40 is further configured to convert each screen shots to one file and store each converted file. When one screen shots (that is, a subscreen) changes, the terminal multiplexing module 40 stores each last-generated screen shots to the file, replaces each file with the last-generated file, and records a timestamp of each last-stored file.

The terminal multiplexing module 40 is further configured to send the converted file to the monitoring module 50 through the SOL connection. The terminal multiplexing module 40 is further configured to divide the display window into equal sections (that is, each equal section is a sub screen) and set each section to correspond to each client 10.

The PXE module 20, the clone module 30, and the terminal multiplexing module 40 control the client 10 to generate the screen shots, which are sent to the monitoring module 50 through the SOL connection, thereby the monitoring module 50 can monitor each screen shots from the clients 10.

The monitoring module 50 is configured to monitor each screen shots according to the file from the terminal multiplexing module 40. Specifically, the screen shots generated by each client 10 when installing the operating system or copying the operating system, executing the native operating system, and executing the native application program, are sent to the monitoring module through the SOL connection. When a fault exists in one the client 10, the display module 60 displays as one abnormal operating system window or a faulty window of the executed application program, thereby enabling the user to view.

FIG. 2 illustrates that in one exemplary embodiment, the number of the clients 10 is four. Each client 10 is connected to the first switch 11 through the BMC port. Each client 10 is connected to the second switch 12 through the NIC port. The remote client screen shots monitoring system 100 is connected to the first and second switches, 11 and 12, through the NIC port.

Figure 3:
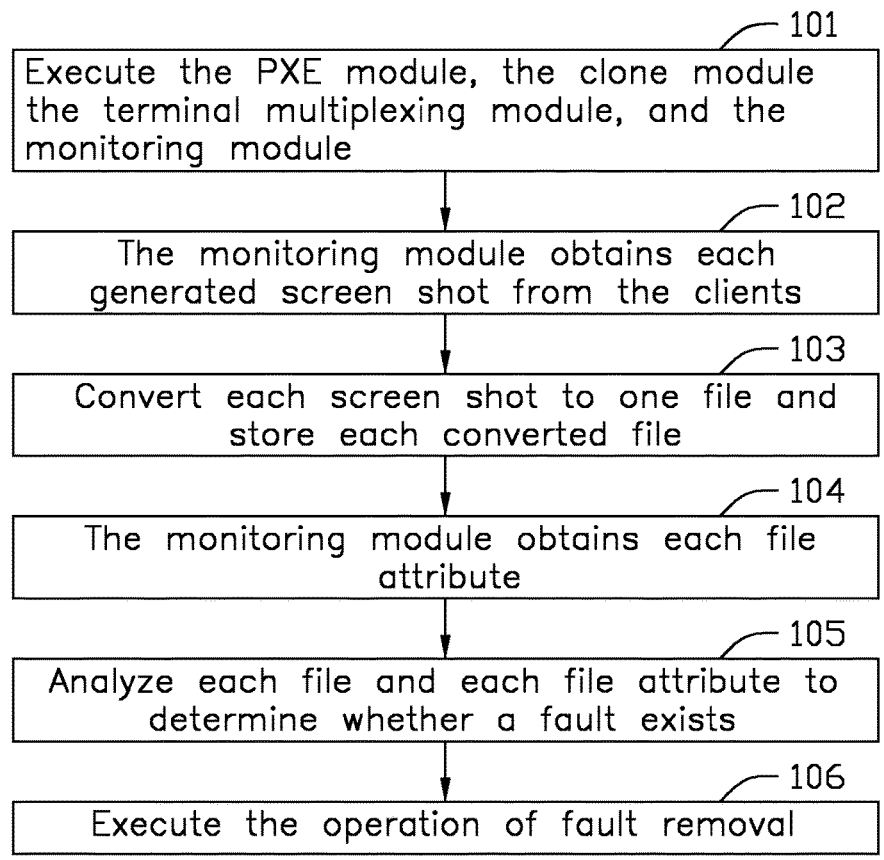
FIG. 3 is a flowchart of one exemplary embodiment of a remote client screen shots monitoring method.

FIG. 3 illustrates a flowchart of a method in accordance with an example embodiment. A remote client screen shots monitoring method is provided by way of example, as there are a variety of ways to carry out the method. The method described below can be carried out using the configurations illustrated in FIGS. 1-2, for example, and various elements of these figures are referenced in explaining the remote client screen shots monitoring method. The illustrated order of blocks is by example only and the order of the blocks can change. Additional blocks may be added or fewer blocks may be utilized without departing from this disclosure. The remote client screen shots monitoring method can begin at block 101.

At block 101, execute the PXE module 20, the clone module 30, the terminal multiplexing module 40, and the monitoring module 50.

Figure 4:
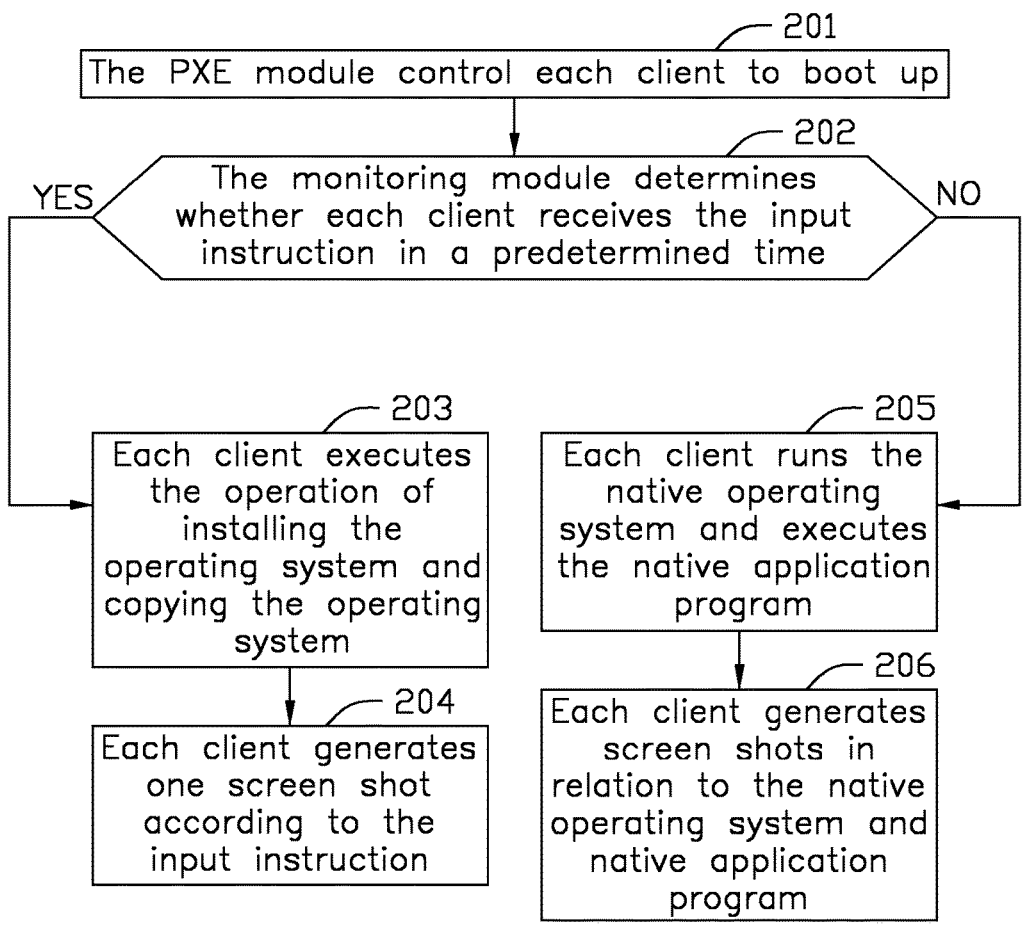
FIG. 4 is a flowchart of one exemplary embodiment of a block 102 of the remote client screen shots monitoring method of FIG. 3.

At block 102, the monitoring module 50 obtains each generated screen shots from the clients 10. Each client 10 executes a plurality of operations to generate a plurality of screen shots, thereby enabling the monitoring module 50 to obtain the generated screen shots from the clients 10. FIG. 4 illustrates a detailed flowchart of the block 102.

At block 103, convert each screen shots to one file and store each converted file. Specifically, the terminal multiplexing module 40 converts the generated screen shots from each client 10 to one file, respectively. The terminal multiplexing module 40 stores each converted file, respectively. Furthermore, when each screen shots changes, the terminal multiplexing module 40 stores each last-generated screen shots to one file, replaces each file with the last-generated file, and records a timestamp of each last-stored file.

At block 104, the monitoring module 50 obtains each file attribute. In the exemplary embodiment, each stored file attribute comprises a file size of each last-stored file and a timestamp of each last-stored file. The monitoring module 50 obtains a file size of each last-stored file and a time of each last-stored file.

Figure 5:
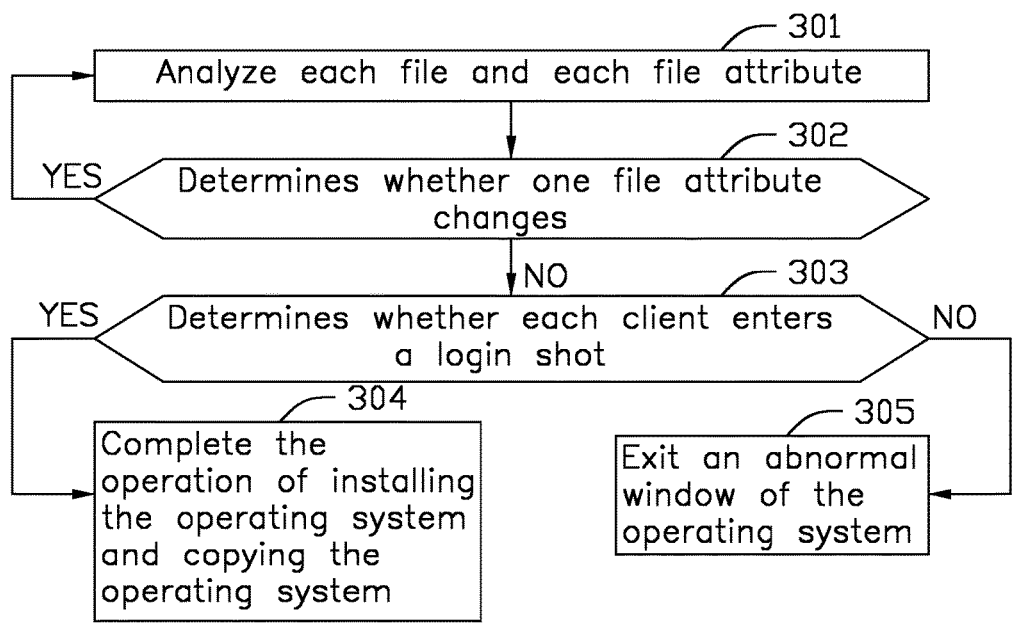
FIG. 5 is a flowchart of one exemplary embodiment of a block 105 of the remote client screen shots monitoring method of FIG. 3 when each client receives input instruction in a predetermined time.
Figure 6:
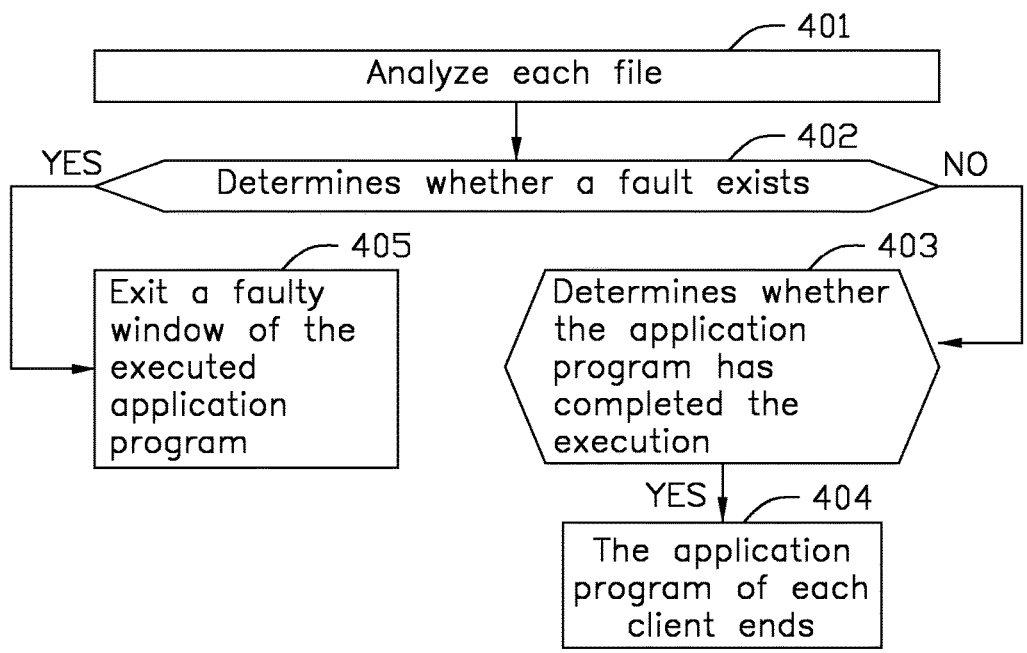
FIG. 6 is another flowchart of another exemplary embodiment of the block 105 of the remote client screen shots monitoring method of FIG. 3 when no client receives the input instruction in the predetermined time.

At block 105, analyze each file and each file attribute to determine whether a fault exists. FIGS. 5 and 6 illustrate a detailed flowchart of block 104.

At block 106, execute the operation of fault removal. Specifically, the user can execute a plurality of operations of fault removal when one known fault displayed on the screen shots exists in the clients 10. For example, the user can control the client 10 to reinstall the operating system through the input module 70 when one client 10 is identified to stop installing the operating system.

FIG. 4 illustrates a flowchart of a block 102 of the remote client screen shots monitoring method in accordance with an example embodiment. The block 102 is provided by way of example, as there are a variety of ways to carry out the method. The block 102 described below can be carried out using the configurations illustrated in FIGS. 1-3, for example, and various elements of these figures are referenced in explaining the flowchart. The illustrated order of blocks is by example only and the order of the blocks can change. Additional blocks may be added or fewer blocks may be utilized without departing from this disclosure. The block 102 can begin at block 201.

At block 201, the PXE module 20 controls the client 10 to boot up. Specifically, the PXE module 20 controls each client 10 to boot up after being executed, thus each client 10 can stay on a PXE boot interface after booting up.

At block 202, the monitoring module 50 determines whether each client 10 receives the input instruction in a predetermined time. If yes, the method goes to block 203; if no, the method goes to block 205. Specifically, each time when a client 10 stays on the PXE boot interface for a period of time longer than the predetermined time, (in the exemplary embodiment, the predetermined time being 10 seconds as an example) and any one client 10 does not receives the input instruction, the method goes to block 205. In the exemplary embodiment, the input instruction can be the instruction of r6-sol or be the instruction of clonezilla-restore.

At block 203, the client 10 executes the operation of installing the operating system and copying the operating system. Specifically, when the input instruction is r6-sol, the PXE module 20 controls each client 10 to automatically install the operating system, and when the input instruction is clonezilla-restore, the clone module 30 controls each client 10 to perform the operation of copying the operating system.

At block 204, each client 10 generates one screen shot, then the method goes to block 103. Specifically, the client 10 generates one screen shot corresponding to the operation of installing the operating system or copying the operating system according to the input instruction.

At block 205, each client 10 runs the native operating system and executes the native application program.

At block 206, each client 10 generates a plurality of screen shots in relation to the native operating system and the native application program, then the method goes to block 103.

FIG. 5 illustrates one flowchart of a block 105 of the remote client screen shots monitoring method in accordance with an example embodiment when each client receives input instruction in a predetermined time. The block 105 is provided by way of example, as there are a variety of ways to carry out the method. The block 105 described below can be carried out using the configurations illustrated in FIGS. 1-3, for example, and various elements of these figures are referenced in explaining the flowchart. The illustrated order of blocks is by example only and the order of the blocks can change. Additional blocks may be added or fewer blocks may be utilized without departing from this disclosure. The block 105 can begin at block 301.

At block 301, analyze each file and each file attribute. Specifically, the monitoring module 50 analyzes each file in relation to each the screen shots to obtain a plurality of keywords displayed on the screen shots.

At block 302, determines whether one file attribute changes. If yes, the method goes to block 301, and if no, the method goes to block 303. Specifically, the monitoring module 50 determines whether each file size of the last-stored file or each time of last-stored file changes.

At block 303, determines whether each client 10 enters a login shot. If yes, the method goes to block 304, and if no, the method goes to block 305. Specifically, the monitoring module 50 converts each login shot to a specified file to obtain a plurality of keyword of the specified file of the login shot, compares the obtained keyword with the predetermined words, and determines whether each client 10 enters a login shot. For example, when the monitoring module 50 obtains a keyword of "welcome", and the predetermined words comprises "welcome", thus the monitoring module 50 determines that the client 10 enters a login shot.

At block 304, complete the operation of installing the operating system and copying the operating system.

At block 305, exit an abnormal window of the operating system, then the method goes to block 106.

In another example embodiment, the monitoring module 50 compares the obtained keywords from each screen shots with the predetermined words, for example, when the monitoring module 50 obtains a keyword of "fail" or "error", and the predetermined words comprises "fail" and "error", thus the monitoring module 50 determines a fault exist in the client 10 when the client 10 performs the operation of executing the application program.

FIG. 6 illustrates another flowchart of a block 105 of the remote client screen shots monitoring method in accordance with an exemplary embodiment when no one client receives the input instruction in the predetermined time. The block 105 is provided by way of example, as there are a variety of ways to carry out the method. The block 105 described below can be carried out using the configurations illustrated in FIGS. 1-3, for example, and various elements of these figures are referenced in explaining the flowchart. The illustrated order of blocks is by example only and the order of the blocks can change. Additional blocks may be added or fewer blocks may be utilized without departing from this disclosure. The block 105 can begin at block 401.

At block 401, analyze each file. Specifically, the monitoring module 50 analyzes each file corresponding to one screen shots to obtain keywords displayed on the screen shots.

At block 402, determines whether a fault exists? If yes, the method goes to block 405, and if no, the method goes to block 403. Specifically, the monitoring module 50 compares the obtained keywords from each screen shots with the predetermined words to determine whether a fault exists in the clients. For example, when the monitoring module 50 obtains a keyword of "fail" or "error", the monitoring module 50 determines a fault exist in the client 10 when the client 10 performs the operation of executing the application program.

At block 403, determines whether the application program has completed the execution? If yes, the method goes to block 404, and if no, the method goes to block 403. Specifically, the monitoring module 50 compares the obtained keywords from each screen shots with the predetermined words to determine whether the application program has completed the execution.

At block 404, the application program of each client 10 ends.

At block 405, exit a faulty window of the executed application program, then the method goes to block 106.

In the remote client screen shots monitoring system and method, the user can control the clients 10 to run the operating system, thereby enabling the clients 10 to perform a plurality of operations. Further, the client 10 generates a plurality of screen shots when performing a plurality of operations, the monitoring module 50 can monitor each screen shots from each client 10, thus, when a fault exists, the user is aware and can deal with the fault to remove the faults. Furthermore, the terminal multiplexing module 40 puts the generated screen shots to display on the display module 60 with a manner of television (TV) wall, thereby enabling the user to view.

The exemplary embodiments shown and described above are only examples. Many details are often found in the art such as the other features of a remote client screen shots monitoring system and a remote client screen shots monitoring method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A remote client screen shots monitoring system for monitoring at least one client, comprising: a preboot execute environment (PXE) module configured to control the at least one client to boot up; a terminal multiplexing module; and a monitoring module communicating data with the PXE module and the terminal multiplexing module through a serial over LAN connection; wherein the at least one client: executes a plurality of operations after booting up; and generates a plurality of screen shots; wherein the monitoring module: obtains the plurality of screen shots from each client; converts each obtained plurality of screen shots to one file; analyzes each converted file; and compares each converted file with a plurality of predetermined words to determine whether a fault exists; wherein the terminal multiplexing module puts each generated screen shot to display on a display in a manner of television wall.

2. The remote client screen shots monitoring system of claim 1, further comprising a clone module, wherein the clone module copies an operating system to each client after being executed, each client generates one corresponding screen shot when performing the copying of the operating system.

3. The remote client screen shots monitoring system of claim 2, wherein the PXE module controls each client to install the operating system, an operation of each client comprises an operation of executing installing the operating system, an operation of copying the operating system, and an operation of executing each native application program.

4. The remote client screen shots monitoring system of claim 2, further comprising a Serial Over Lan (SOL) connection, wherein each of the PXE module, the clone module, and the terminal multiplexing module communicates with the monitoring module through the SOL connection.

5. The remote client screen shots monitoring system of claim 1, wherein the terminal multiplexing module stores each converted file, the terminal multiplexing module replaces each converted file with a last-stored file to store.

6. The remote client screen shots monitoring system of claim 5, wherein the monitoring module further obtains the converted file attribute of each converted file, the converted file attribute comprises a file size of each last-stored converted file.

7. The remote client screen shots monitoring system of claim 6, wherein the file attribute further comprises a time of last-stored the file.

8. The remote client screen shots monitoring system of claim 1, wherein each client comprises a baseboard management controller (BMC) port, each client is connected to a first switch through the BMC port.

9. The remote client screen shots monitoring system of claim 8, further a network interface controller (NIC) port, wherein each client further comprises an NIC port, each client is connected to a second switch through the NIC port, and the remote client screen shots monitoring system is connected to the first switch and the second switch through the NIC port.

10. The remote client screen shots monitoring system of claim 1, further comprising an input module, wherein the input module inputs instructions to each client to control each client to execute the operation of executing installing the operating system, the operation of copying the operating system, and the operation of executing each native application program.

11. A remote client screen shots monitoring method used in a remote client screen shots monitoring system and monitoring at least one client, the remote client screen shots monitoring system comprising a preboot execute environment (PXE) module, a terminal multiplexing module, and a monitoring module, wherein the PXE module controls the at least one client to boot up after being executed, each client executes a plurality of operations after booting up and generates at least one screen shots, the remote client screen shots monitoring method comprising: executing the PXE module, the terminal multiplexing module, and the monitoring module; the PXE module controlling the at least one client to boot up; obtaining the generated screen shots from the at least one client by the monitoring module; converting each generated screen shot to one file by the monitoring module; analyzing each converted file by the monitoring module; and comparing each converted file with a plurality of predetermined words to determine whether a fault exists by the monitoring module.

12. The remote client screen shots monitoring method of claim 11, further comprising a step of determining whether each client received an input instruction in a predetermined time after a step of the PXE module controlling the at least one client to boot up.

13. The remote client screen shots monitoring method of claim 12, further comprising a step of controlling each client to execute an operation of installing the operating system or copying the operating system after a step of each client receiving the input instruction in the predetermined time.

14. The remote client screen shots monitoring method of claim 13, wherein a step of analyzing each converted file by the monitoring module further comprising a step of analyzing the converted file attribute of each converted file, the remote client screen shots monitoring method further comprises a step of determining whether the converted file attribute of each converted file is changed.

15. The remote client screen shots monitoring method of claim 14, further comprising a step of determining whether each client entered a login shot when the monitoring module determines the converted file attribute of each converted file is unchanged.

16. The remote client screen shots monitoring method of claim 15, further comprising a step of determining whether each client finished installing the operating system or copying the operating system when each client entered the login shot.

17. The remote client screen shots monitoring method of claim 15, further comprising a step of determining a fault exists when one of the clients did not enter the login shot.

18. The remote client screen shots monitoring method of claim 14, wherein the converted file attribute comprises a file size of each last-stored converted file and a time of each last-stored converted file.

19. The remote client screen shots monitoring method of claim 12, further comprising a step of controlling each client to run a native operating system of each client and to execute a native application program of each client when at least one client received the input instruction in the predetermined time.

20. The remote client screen shots monitoring method of claim 11, wherein the terminal multiplexing module puts each generated screen shot to display in a manner of television (TV) wall.

\* \* \* \* \*